(12) United States Patent
Jiang et al.

(10) Patent No.: US 10,180,940 B2
(45) Date of Patent: Jan. 15, 2019

(54) METHOD AND SYSTEM OF PERFORMING A TRANSLATION

(71) Applicant: Alibaba Group Holding Limited, Grand Cayman (KY)

(72) Inventors: Hongfei Jiang, Hangzhou (CN); Jun Lu, Hangzhou (CN); Weihua Luo, Hangzhou (CN); Feng Lin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/273,509

(22) Filed: Sep. 22, 2016

(65) Prior Publication Data

US 2017/0083513 A1 Mar. 23, 2017

(30) Foreign Application Priority Data

Sep. 23, 2015 (CN) .......................... 2015 1 0614226

(51) Int. Cl.
*G06F 17/28* (2006.01)
*G06F 17/27* (2006.01)

(52) U.S. Cl.
CPC ........ *G06F 17/2872* (2013.01); *G06F 17/277* (2013.01)

(58) Field of Classification Search
CPC ............................ G06F 17/2872; G06F 17/277
USPC ............................................................. 704/2
See application file for complete search history.

(56) References Cited

U.S. PATENT DOCUMENTS

| 6,085,162 | A | 7/2000 | Cherny |
| 7,249,012 | B2 | 7/2007 | Moore |
| 8,175,864 | B1 | 5/2012 | Dubiner |
| 2003/0097252 | A1 | 5/2003 | MacKie |
| 2007/0016400 | A1 | 1/2007 | Soricutt et al. |
| 2008/0120092 | A1* | 5/2008 | Moore ................ G06F 17/2827 704/4 |
| 2009/0299729 | A1 | 12/2009 | Quirk et al. |
| 2009/0326916 | A1* | 12/2009 | Gao ...................... G06F 17/277 704/4 |

(Continued)

OTHER PUBLICATIONS

PCT Search Report and Written Opinion dated May 19, 2017 for PCT Application No. PCT/IB2016/001568, 11 pages.

(Continued)

*Primary Examiner* — Bharatkumar S Shah
(74) *Attorney, Agent, or Firm* — Lee & Hayes, PLLC (57) ABSTRACT

A translation method is disclosed herein. The method includes determining a target object to be translated, the target object including a plurality of elements; dividing the target object to be translated according to a language correspondence relationship to obtain at least one element set; determining a weight value of a second object corresponding to each first object in each element set according to the language correspondence relationship; determining a comparison value associated with each element set according to the determined weight value and selecting an element set with the maximum comparison value; determining a second object with the maximum weight value corresponding to each first object in the selected element set according to the correspondence relationship, combining all the determined second objects to form a translation content of the target object.

20 Claims, 5 Drawing Sheets

(56) References Cited

U.S. PATENT DOCUMENTS

| | | | |
|---|---|---|---|
| 2010/0174524 A1* | 7/2010 | Koehn | G06F 17/2755 704/4 |
| 2012/0101804 A1 | 4/2012 | Roth et al. | |
| 2012/0130705 A1 | 5/2012 | Sun | |
| 2014/0149102 A1 | 5/2014 | Marcu et al. | |
| 2014/0358519 A1 | 12/2014 | Mirkin et al. | |
| 2015/0205783 A1 | 7/2015 | Anisimovich | |

OTHER PUBLICATIONS

Github, jWordSplitter 4.4—Snapshot, retrieved May 4, 2018 located at https://github.com/danielnaber/jwordsplitter, 3 pages.

* cited by examiner

METHOD AND SYSTEM OF PERFORMING A TRANSLATION

CROSS REFERENCE TO RELATED PATENT APPLICATION

This application claims foreign priority to Chinese Patent Application No. 201510614226.5 filed on Sep. 23, 2015, entitled "Method and System of Performing a Translation", which is hereby incorporated by reference in its entirety.

TECHNICAL FIELD

The present disclosure relates to the field of automated information processing technologies, and in particular, to methods and systems of performing a translation.

BACKGROUND

International e-commerce businesses involve a number of major languages that exist in the world, especially languages having a relatively broad coverage. In order to solve problems of language barriers that occur in information acquisition, searches and transactions, etc., machine translation technologies are needed.

World languages that have a broad range of applications can be classified into agglutinative languages, such as German, Finnish, Japanese and Arabic, for example. Due to a flexible combination mode of word roots and affixes, these languages have a large number of single words that are spliced together, which generally cannot be covered by a training corpus and thus belong to unlisted words. As such, a valid translation may not be obtained when being decoded using a machine translation, which severely affects the readability of a translated text. A German word "Leserkommentarspaltenhöllenlärm" is used as an example. This German word is formed by a combination of three semantic items. Being a synthetic word formed by three semantic items, this German word forms an unlisted word.

However, when this German word is partitioned and paraphrased into "Leserkommentar Spalten Höllenlärm", a suitable translation can be obtained. Apparently, this problem cannot be perfectly resolved by a simple partition. For example, "中国" may be divided into "中" and "国", which are then translated from Chinese into English respectively. A translated text that is obtained thereby may be "middle country". Moreover, after partition, an unlisted word may generate more unlisted words. For example, "x1x2x3x4" may be divided into "x1x2 x3x4". This not only increases the number of unlisted words, but also potentially scatters these two unlisted words in a translated text due to an ordering adjustment, thereby further weakening the readability of the translated text.

Existing partition and paraphrase methods mainly rely on training a model by using a corpus that is generated through manual word segmentation and grammatical labeling by linguists as a training text, and perform a word segmentation using the trained model. If a difference between a text to be translated and a trained model is large, more resources are needed to update the existing trained model.

In view of the above, a problem exists that more resources are needed to update an existing trained model when a significant difference between a text to be translated and a trained model exists in existing word segmentation technologies.

SUMMARY

Embodiments of the present disclosure provide a method and a system for conducting a translation to solve the problem in the existing technologies that more resources are needed for updating an existing trained model when a significant difference between a text to be translated and a trained model exists.

In implementations, the method may include determining a target object to be translated, the target object including a plurality of elements; dividing the target object to be translated based on a language correspondence relationship to obtain at least one element set, where the language correspondence relationship includes a plurality of first objects of a first language, at least one corresponding second object of a second language to which each first object is translated and a corresponding weight value of each second object, the first object and the second object include at least one element, the element set includes multiple first objects, and each element set includes all the plurality of elements of the target object, the first language is a language of the target object, the second language is a language of a machine translation; determining a weight value of a second object corresponding to each first object in each element set based on the language correspondence relationship; determining a comparison value of each element set based on the determined weight value, and selecting an element set with the maximum comparison value; and determining a second object having a maximum weight value corresponding to each first object in the selected element set based on the correspondence relationship, and combining all the determined second objects as translation content of the target object.

In implementations, determining the target object to be translated may include using a source object of the first language to be translated as the target object to be translated; or using an object obtained after a root or affix transformation of the source object of the first language to be translated as the target object to be translated.

The probability of correctly translating the target object to be translated is increased after undergoing the root or affix transformation.

In implementations, dividing the target object to be translated based on the language correspondence relationship to obtain the at least one element set may include:

constructing the target object to be translated into an element group to be partitioned;

traversing each element of the element group to be partitioned in an order from left to right, and determining whether a partition point in the element group to be partitioned exists, where an object formed by elements before the partition point and an object formed by elements after the partition point in the element group to be partitioned exist in the language correspondence relationship;

if partition points exist, determining an optimal partition point of the element group to be partitioned from among the partition points, where a product of a weight value of a second object corresponding to an object before the optimal partition point and a weight value of a second object corresponding to an object after the optimal partition point in the element group to be partitioned is the maximum, as determined according to the language correspondence relationship;

treating the object formed by elements before the optimal partition point and the object after the optimal partition point as element groups to be partitioned, and returning to the operation of determining whether a partition point exists in the element group to be partitioned;

if no partition point exists, terminating the partitioning of the element group to be partitioned; and if partitioning of all the element groups to be partitioned is terminated, determining at least one element set according to each element group to be partitioned.

As can be seen, the above process of partitioning is a recursive process. An execution function is only needed to be executed repeatedly when processing a program, and such weight-based processing provides a high accuracy of partitioning.

In implementations, determining the at least one element set according to each element group to be partitioned may include treating an object formed by elements before each optimal partition point and an object formed by elements after each optimal partition point as first objects; and determining at least one element set according to each first object, where each first object is included in at least one element set, elements included in all the first objects in an element set are identical to elements included in the target object, and a position of each element in the element set is the same as a respective position in the target object, and respective first objects included in different element sets are not completely the same.

The element set formed by the above approach of determining an element set forms content for subsequent translation to make preparation for subsequent machine translation.

In implementations, dividing the target object to be translated according to the language correspondence to obtain the at least one element set may include dividing the target object into a plurality of shortest first objects according to an order of each element in the target object, where each of the shortest first objects is included in the language correspondence relationship; and combining multiple shortest first objects to obtain elongated first objects according to an order of the shortest first objects, and each time after an elongated first object is obtained, combining the obtained elongated first object and existing first objects to form an element set, where elements included in all first objects of an element set are the same as elements included in the target object, and a position of each element in the element set is the same as that in the target object, and respective first objects included in different element sets are not completely the same.

The above division approach actually adopts an idea of dynamic planning, and takes weight values into consideration, which also increases the accuracy of partitioning, and improves the processing efficiency of partitioning as compared with the first partitioning method.

In implementations, determining the comparison value of each element set according to the determined weight value may include determining, for an element set, a weight value of a second object corresponding to each first object in the element set; and multiplying determined weight values to obtain the comparison value of the element set.

Filtering an element set based on a product result of weight values can filter a case in which the target object to be translated is divided into an excessive number of word segments, thereby further improving the accuracy of the partitioning result.

Based on the same inventive concept, the embodiments of the present disclosure further provide a system of performing a translation. In implementations, the system may include:

a target object determination unit to determine a target object to be translated, the target object including a plurality of elements;

a target object division unit to divide the target object to be translated based on a language correspondence relationship to obtain at least one element set, where the language correspondence relationship includes a plurality of first objects of a first language, at least one corresponding second object of a second language to which each first object is translated and a corresponding weight value of each second object, the first object and the second object include at least one element, the element set includes multiple first objects, and each element set includes all the plurality of elements of the target object, the first language is a language of the target object, the second language is a language of a machine translation;

a weight value determination unit to determine a weight value of a second object corresponding to each first object in each element set based on the language correspondence relationship;

an element set determination unit to determine a comparison value of each element set based on the determined weight value, and select an element set with the maximum comparison value; and a translation content determination unit to determine a second object having a maximum weight value corresponding to each first object in the selected element set based on the correspondence relationship, and combine all the determined second objects as translation content of the target object.

In implementations, the target object determination unit may further configured to use a source object of the first language to be translated as the target object to be translated, or use an object obtained after a root or affix transformation of the source object of the first language to be translated as the target object to be translated.

The probability of correctly translating the target object to be translated is increased after undergoing the root or affix transformation.

In implementations, the target object division unit may further be configured to:

construct the target object to be translated into an element group to be partitioned;

traverse each element of the element group to be partitioned in an order from left to right, and determining whether a partition point in the element group to be partitioned exists, where an object formed by elements before the partition point and an object formed by elements after the partition point in the element group to be partitioned exist in the language correspondence relationship;

if partition points exist, determine an optimal partition point of the element group to be partitioned from among the partition points, where a product of a weight value of a second object corresponding to an object before the optimal partition point and a weight value of a second object corresponding to an object after the optimal partition point in the element group to be partitioned is the maximum, as determined according to the language correspondence relationship;

treat the object formed by elements before the optimal partition point and the object after the optimal partition point as element groups to be partitioned, and return to the operation of determining whether a partition point exists in the element group to be partitioned;

if no partition point exists, terminate the partitioning of the element group to be partitioned; and if partitioning of all the element groups to be partitioned is terminated, determining at least one element set according to each element group to be partitioned.

As can be seen, the above process of partitioning is a recursive process. An execution function is only needed to be executed repeatedly when processing a program, and such weight-based processing provides a high accuracy of partitioning.

In implementations, the element set determination unit may further be configured to treat an object formed by elements before each optimal partition point and an object formed by elements after each optimal partition point as first objects, and determine at least one element set according to each first object, where each first object is included in at least one element set, elements included in all the first objects in an element set are identical to elements included in the target object, and a position of each element in the element set is the same as a respective position in the target object, and respective first objects included in different element sets are not completely the same.

The element set formed by the above approach of determining an element set forms content for subsequent translation to make preparation for subsequent machine translation.

In implementations, the target object division unit may further be configured to divide the target object into a plurality of shortest first objects according to an order of each element in the target object, where each of the shortest first objects is included in the language correspondence relationship; and combine multiple shortest first objects to obtain elongated first objects according to an order of the shortest first objects, and each time after an elongated first object is obtained, combining the obtained elongated first object and existing first objects to form an element set, where elements included in all first objects of an element set are the same as elements included in the target object, and a position of each element in the element set is the same as that in the target object, and respective first objects included in different element sets are not completely the same.

The above division approach actually adopts an idea of dynamic planning, and takes weight values into consideration, which also increases the accuracy of partitioning, and improves the processing efficiency of partitioning as compared with the first partitioning method.

In implementation, the system may further include a comparison value determination unit to determine, for an element set, a weight value of a second object corresponding to each first object in the element set; and multiplying determined weight values to obtain the comparison value of the element set.

Filtering an element set based on a product result of weight values can filter a case in which the target object to be translated is divided into an excessive number of word segments, thereby further improving the accuracy of the partitioning result.

In an aspect of the embodiments of the present disclosure, a target object to be translated is determined first, and the target object to be translated is divided based on a language correspondence relationship to obtain at least one element set. In other aspects, a weight value of a second object corresponding to each first object in each element set is determined based on the language correspondence relationship, a maximum weight value of the second object corresponding to each first object in each element set is selected, multiplied to obtain a comparison value corresponding to the element set, thereby obtaining an element set having a maximum product result after comparison, where all second objects included in the element set having the maximum product result form a translation content of the target object. In this way, when an unlisted word of a target object to be translated that cannot be found in existing translation models exists, the embodiments provided in the present disclosure partition the target object to be translated, and set a weight value of a second object corresponding each first object in each element set, determine an optimal translation content of the target object based on a computed comparison result of weight values, thus facilitating a more accurate translation result. As can be seen, the present disclosure does not need to rely on more resources to update an existing training model, and an accurate translation result can be obtained using the embodiments provided in the present disclosure.

DETAILED DESCRIPTION

In the present disclosure, when an unlisted word of a target object to be translated that cannot be found in existing translation models exists, the embodiments provided in the present disclosure partition the target object to be translated, and set a weight value of a second object corresponding each first object in each element set, determine an optimal translation content of the target object based on a computed comparison result of weight values, thus facilitating a more accurate translation result. Indeed, other than combining with existing translation models, the embodiments of the present disclosure can also be referenced to get an accurate translation result if no unlisted word can be found in other translation methods. Apparently, the embodiments provided in the present disclosure can completely be used as an independent translation solution for directly translating a text and can obtain a better translation result without the need to combine with any existing translation model and other translation methods.

The embodiments of the present disclosure improve the existing machine translation methods to obtain a more accurate translation result, which first determines a target object to be translated, then performs a partitioning thereof and performs a process of machine translation. A target object described herein is referred to as an advanced language structure (a term or a phrase), especially an unlisted word/term.

It should be noted that, the advanced language structure described herein refers to a complete set (a Chinese term may be a single character word merely including a single Chinese character, or a multi-character word including a plurality of Chinese characters) of all Chinese terms for Chinese language. For western languages as represented by English, the advanced language structure that is contemplated herein may refer to a word phrase formed by a plurality of words (for example, a complicated noun phrase like "People's Republic of China").

In implementations, an unlisted word is a source advanced language structure for which no corresponding translation result can be found in an existing translation model. For example, a Chinese term "墙纸" does not have a corresponding English term in an existing translation model, and is an unlisted word. However, a combination of English translation results "wall+paper" corresponding to words "墙+纸" obtained after partitioning forms "wallpaper". As can be seen, such translation result obtained by partitioning and combination corresponds to a correct English translation of the term.

In addition, machine translation refers to a process of translating a natural source language to another natural target language using a computer.

A table of language correspondence relationship used in the following embodiments of the present disclosure refers to a mapping relationship table of first objects and second objects, where multiple second objects may exist due to similar meanings. A certain weight value is assigned to each second object according to a data statistical result, and a part of content of the language correspondence relationship table is shown in Table 1.

TABLE 1

| First Object | Second Object | |
|---|---|---|
| ... | ... | ... |
| 人民 | People (0.82) | Human (0.18) |
| 墙 | Wall (0.55) | Dado (0.45) |
| 纸 | Paper (0.66) | Parchment (0.34) |
| ... | ... | ... |

The above language correspondence relationship table is a language correspondence relationship table using mutual translation between the Chinese language and the English language as an example. In implementations of the present disclosure, a language correspondence relationship may include, but not limited to, a translation relationship table between Chinese language and English language, and may also be applicable to other natural languages, as long as training of a language relationship table for related natural languages is completed before performing corresponding translation.

A language correspondence relationship table is built up by conducting data statistics based on statistical results of an input method and a respective result of each online translation, where weight values are updated in real time as the number of data statistics increases to ensure the accuracy of a translation result.

Figure 1:
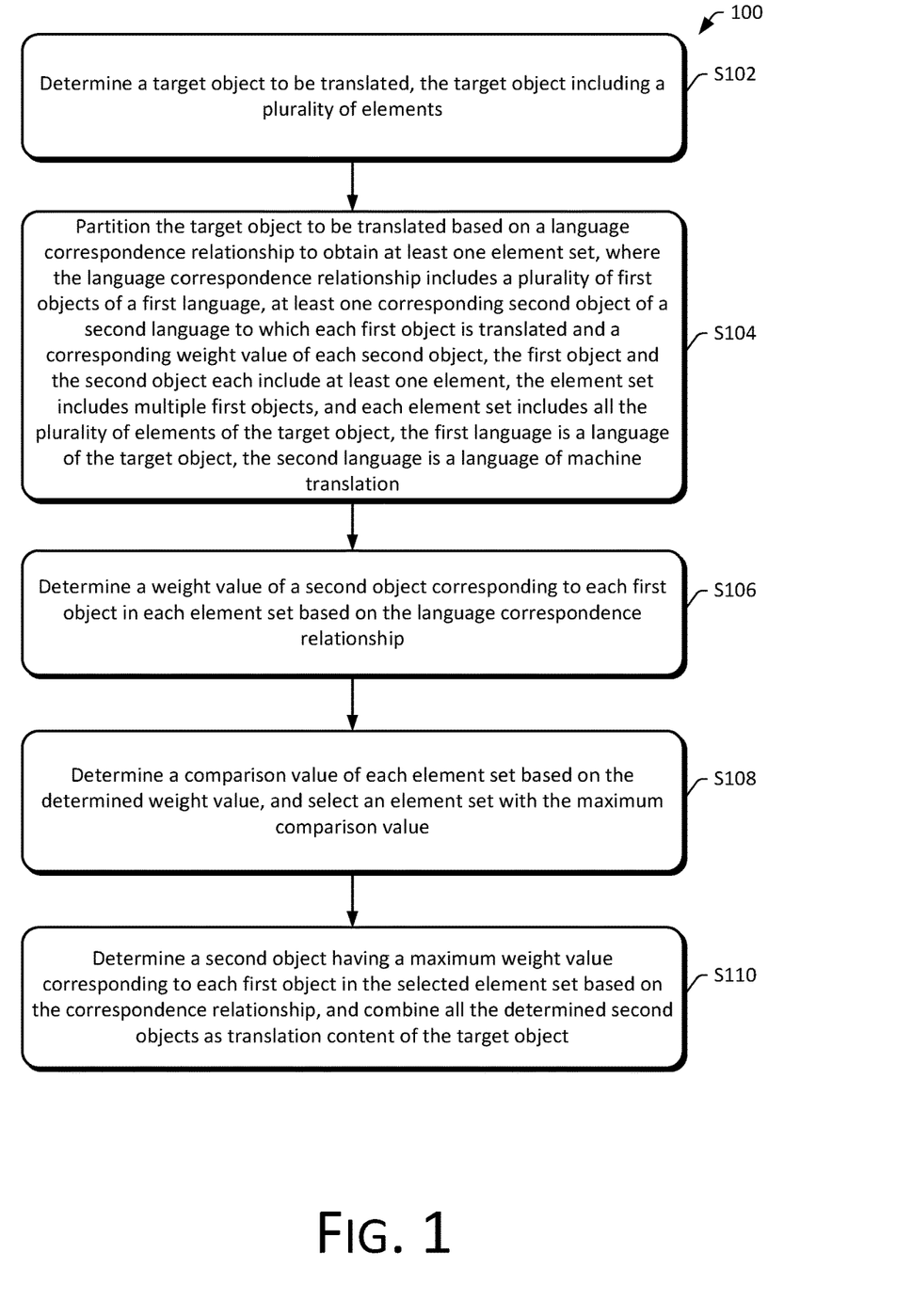
FIG. 1 is a flowchart illustrating a method of performing a translation according to the embodiments of the present disclosure.

FIG. 1 shows a flowchart of a machine translation method 100 in accordance with the embodiments of the present disclosure. In implementations, the example method 100 may include the following operations.

S102 determines a target object to be translated, the target object including a plurality of elements.

S104 partitions the target object to be translated based on a language correspondence relationship to obtain at least one element set, where the language correspondence relationship includes a plurality of first objects of a first language, at least one corresponding second object of a second language to which each first object is translated and a corresponding weight value of each second object, the first object and the second object each include at least one element, the element set includes multiple first objects, and each element set includes all the plurality of elements of the target object, the first language is a language of the target object, the second language is a language of machine translation.

S106 determines a weight value of a second object corresponding to each first object in each element set based on the language correspondence relationship.

S108 determines a comparison value of each element set based on the determined weight value, and selects an element set with the maximum comparison value.

S110 determines a second object having a maximum weight value corresponding to each first object in the selected element set based on the correspondence relationship, and combines all the determined second objects as translation content of the target object.

When performing S102, a source object of the first language to be translated is taken as the target object to be translated. Alternatively, an object obtained after a root or affix transformation of the source object of the first language to be translated is taken as the target object to be translated. The probability of correctly translating the target object to be translated is increased due to the root or affix transformation. Affixes include prefixes, postfixes and/or infixes. For example, a German term "Verlagshaus" may be partitioned as "Verlag s haus", where s is an infix. In implementations, in case of a root or affix transformation, for example, multiple transformations, English term "china" may be transformed into "chinese". In addition, a target object may include a plurality of elements. An element may represent different meanings in different natural languages. For Chinese language, an element refers to each Chinese character, and for western languages such as English, an element refers to each letter. For example, after multiple transformations, a target object "chinese" may have elements such as "c, h, i, n, e, s, e". An unlisted word "中国 人民解放军" may have elements such as "中, 国, 人, 民, 解, 放, 军".

After the target object is determined, a process of partitioning is performed. In implementations, a number of partitioning methods are provided in the present disclosure. A real application, however, is not limited to these methods.

Figure 2:
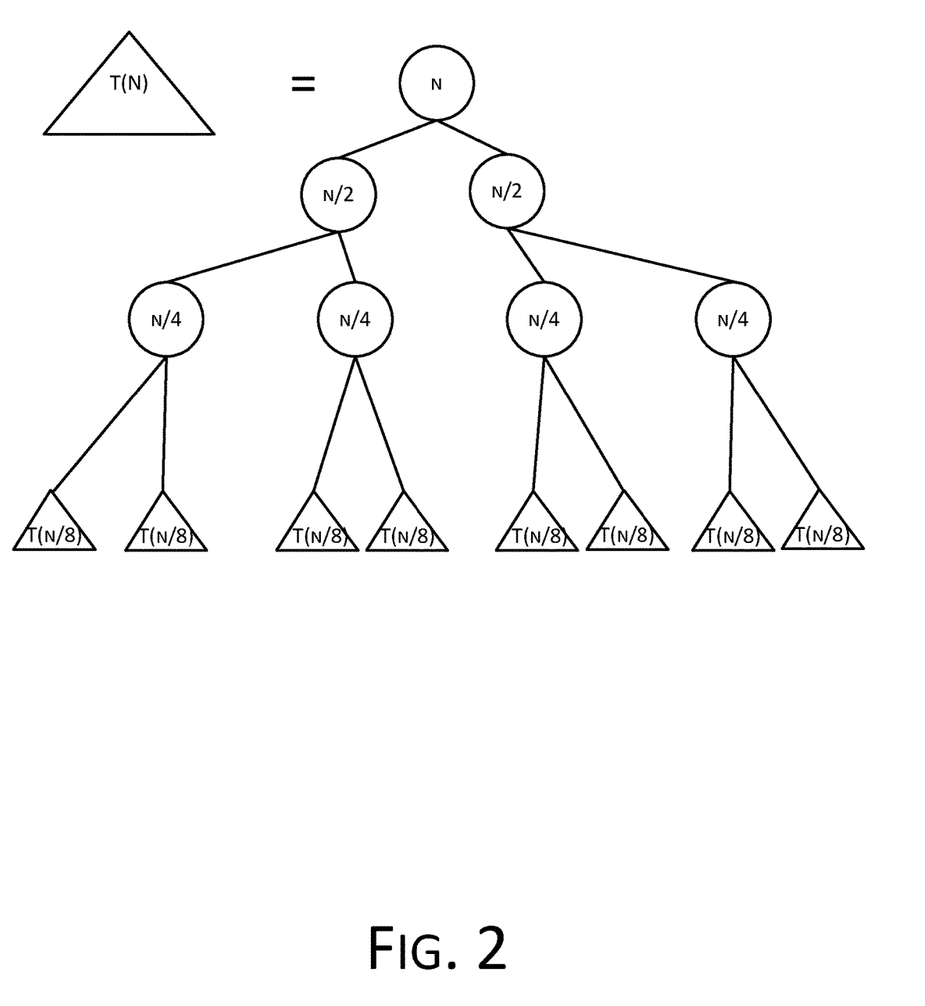
FIG. 2 is a flowchart illustrating a first partitioning method according to the embodiments of the present disclosure.

As shown in FIG. 2, a first partitioning method may include:

constructing a target object to be translated into an element group to be partitioned;

traversing each element of the element group to be partitioned in an order from left to right, and determining whether a partition point in the element group to be partitioned exists, where an object formed by elements before the partition point and an object formed by elements after the partition point in the element group to be partitioned exist in the language correspondence relationship;

if partition points exist, determining an optimal partition point of the element group to be partitioned from among the partition points, where a product of a weight value of a second object corresponding to an object before the optimal partition point and a weight value of a second object corresponding to an object after the optimal partition point in the element group to be partitioned is the maximum, as determined according to the language correspondence relationship;

treating the object formed by elements before the optimal partition point and the object after the optimal partition point as element groups to be partitioned, and returning to the operation of determining whether a partition point exists in the element group to be partitioned;

if no partition point exists, terminating the partitioning of the element group to be partitioned; and if partitioning of all the element groups to be partitioned is terminated, determining at least one element set according to each element group to be partitioned.

In implementations, determining the at least one element set according to each element group to be partitioned may include treating an object formed by elements before each optimal partition point and an object formed by elements after each optimal partition point as first objects; and determining at least one element set according to each first object, where each first object is included in at least one element set, elements included in all the first objects in an element set are identical to elements included in the target object, and a position of each element in the element set is the same as a respective position in the target object, and respective first objects included in different element sets are not completely the same. In this way, element sets formed thereby form the content of subsequent translation, and prepare for subsequent machine translation.

For example, given an unlisted word "abcdefg", only one element group to be partitioned [abcdefg] currently exists. Traversing is performed from the first letter a to find the first optimal partition point, while ensuring that terms before and after such partition point can be found in a language correspondence relationship table, and a product of weight values of such two portions (which are formed using the partition point to divide [abcdefg]), is the maximum as compared with results of other partition points. According to this rule, [abcdefg] is partitioned into two element groups to be partitioned, [abcd] and [efg]. The element group to be partitioned, [abcd] and [efg], are then further partitioned according to the above method until no partition point exists, and partitioning of element groups to be partitioned is terminated accordingly. An element set may then be determined based on element groups to be partitioned obtained in each partitioning and element groups to be partitioned that are generated previously.

For another example, given an unlisted word "中国人民解放军", traversing is performed from the first character "中" to find a partition point, with a requirement of ensuring that terms before and after the partition point can be found in a language correspondence relationship table. The partition point divides "中国人民解放军" into two parts. Two scenarios may exist for this partition point, namely, "中国/人民解放军" and "中 国人民/解放军", for example. In order to obtain a better partition point, weight values in the language correspondence table are used at this point, and a weight product of an element set obtained from the combination "中国+人民解放军" is found to be maximum after calculation. Accordingly, the first optimal partition point is determined to be located between "国" and "人", and a partitioning result is "中国+人民解放军".

These two parts "中国" and "人民解放军" are then further partitioned individually according to the above method. "中国" is found to be "中" and "国" after partition. The partition point between "中" and "国", is unique and is therefore the optimal partition point therefor. In addition, "人民解放军*" is partitioned into "人民" and "解放军". The partition point between "人民" and "解放军", is unique and is therefore the optimal partition point therefor.

Next, "人民" and "解放军" are further partitioned individually according to the above method to obtain "人" and "民". The partition point is between 人 and 民, which is unique and therefore is the optimal partition point. In addition, "解放军" is partitioned into "解放" and "军". The partition point is between 解放 and 军, which is unique and therefore is the optimal partition point.

Finally, "解放" is further partitioned according to the above method to obtain "解" and "放". The partition point is between "民解放军" and "放", is unique and is therefore the optimal partition point.

In this way, a process of partitioning for "中国人民解放军" is completed as above. Each time when an optimal partition point is obtained, an element set is generated. Therefore, the following element sets are obtained:

(1) Element set={"中国","人民解放军"};
(2) Element set={"中国","人民","解放军"};
(3) Element set={"中","国","人民解放军"};
(4) Element set={"中","国","人民","解放军"};
(5) Element set={"中","国","人","民","解放军"};
(6) Element set={"中","国","人","民","解放","军"};
(7) Element set={"中","国","人","民","解","放","军"}.

A part of content of the language correspondence relationship table corresponding to first objects in "中国人民解放军" is shown in Table 2.

TABLE 2

| First Object | Second Object | |
|---|---|---|
| 中 | middle (A1) | |
| 中国 | China (A2) | |
| 人民 | people (A3) | human (A4) |
| 人民解放军 | The people's liberation army (A5) | |
| 中国人 | Chinese (A6) | |
| 解放 | liberaton (A7) | |
| 解放军 | liberaton army (A8) | |

By using weight values associated with the first objects in "中国人民解放军", weight values of subsets in each of the above six element sets are multiplied to obtain a respective weight value product result for each element set. Finally, a product result of the first element set is the maximum. For example, a weight value product of first objects in the second element set is A2*A3*A8, and the product result obtained by A2*A3*A8 is the maximum value. Therefore, an optimal partitioning result is determined to be "中国+人民 解放军", and the partitioning of the unlisted word "中国人民解放军" is completed at this point. Accordingly, the above partitioning process is actually a recursive process. Only one execution function needs to be repeatedly executed when processing a program, and such weight-based processing provides a partitioning result having a higher accuracy. Moreover, filtering element sets via a weight value product result can avoid a situation in which a target object to be translated is partitioned into an excessive number of word segments, thereby further improving the accuracy of the partitioning result.

Figure 3:
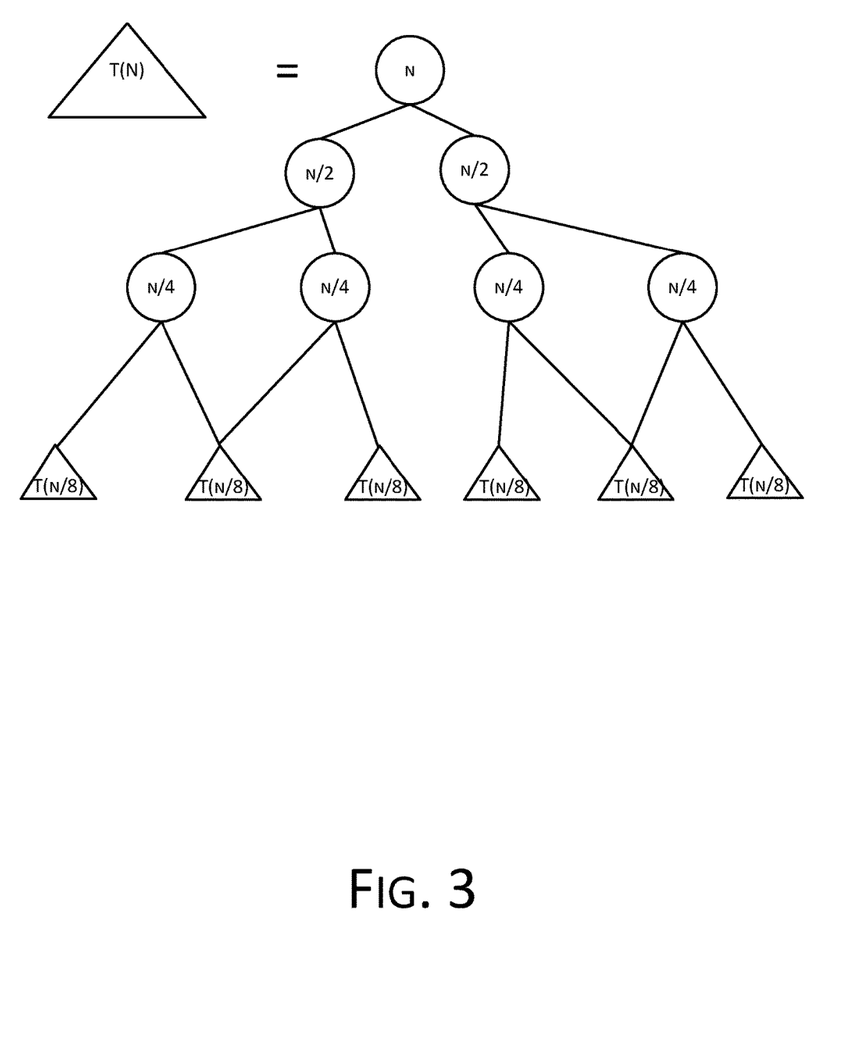
FIG. 3 is a flowchart illustrating a second partitioning method according to the embodiments of the present disclosure.

As shown in FIG. 3, a second partitioning method may include dividing a target object into a plurality of shortest first objects according to an order of each element in the target object, where each of the shortest first objects is included in a language correspondence relationship; and combining multiple shortest first objects to obtain elongated first objects according to an order of the shortest first objects, and each time after an elongated first object is obtained, combining the obtained elongated first object and existing first objects to form an element set, where elements included in all first objects of an element set are the same as elements included in the target object, and a position of each element in the element set is the same as that in the target object, and respective first objects included in different element sets are not completely the same.

For example, given an unlisted word abcd, the word is partitioned using the above method. First, each element {a, b, c, d} of the unlisted word is obtained. Then, elements are combined according to a certain order and a principle of increasing character length to obtain a number of elongated first objects. An example elongating method is shown in Table 3, which is in an order from bottom to top and from left to right.

TABLE 3

|  | | Column 1 | Column 2 | Column 3 | Column 4 |
|---|---|---|---|---|---|
|  | | a | b | c | d |
| Row 1 | a | a | ab | abc | abcd |
| Row 2 | b |  | b | bc | bcd |
| Row 3 | c |  |  | c | cd |
| Row 4 | d |  |  |  | d |

As can be seen, a first object obtained by elongating [1,1], [2,2], [3,3] and [4,4] on a diagonal line corresponds to each element {a, b, c, d} of the unlisted word obtained by intersection of rows and columns, which continues to extend or elongate upwards in a direction indicated by arrows according to an order of increasing character length. [1,2], [2,3] and [3,4] obtain first objects ab, bc and cd correspondingly. Likewise, [1,3] and [2,4] obtain abc and bcd accordingly, and finally [1,4] corresponds to the target object abcd. Since an element set is generated each time when an elongated first object is found, the following element sets exist:

(1) Element set={"a", "b", "c", "d"};
(2) Element set={"ab", "c", "d"};
(3) Element set={"a", "bc", "d"};
(4) Element set={"a", "b", "cd"};
(5) Element set={"abc", "d"};
(6) Element set={"a", "bcd"};
(7) Element set={"abcd"}.

Second, third and fourth element sets belong to one type. Respective weight product results are determined for the element sets of this type, and only the group having the largest product result is maintained or kept. Likewise, fifth and sixth element sets are of a same type. Respective weight product results are determined for the element sets of this type, and only the group with the largest product result is maintained. In this way, only an optimal element set corresponding to an elongated first object of each type is provided in a final output. A longitudinal comparison may be performed based on these optimal element sets to finally obtain and determine an element set having the maximum product result as a final partitioning result. This type of partitioning method actually applies an idea of dynamic planning, and takes weight values into consideration, which also increases the accuracy of partitioning, and improves the processing efficiency of partitioning as compared with the first partitioning method.

A Third Partitioning Method:

The present disclosure further provides a partitioning method, which may include traversing from a first element of a target object, successively searching a language correspondence relationship table for first object(s) corresponding to combination(s) of this element and one or more subsequent elements, and constructing an element set each time when a first object is determined.

For example, traversing is started from a first character "中" in an unlisted word "中国人民解放军"", and first objects, which include "中国", "中国人", "中国人民" and "中国人民解放军" are found successively from a language correspondence relationship table. Traversing is then started from "国" to find a first object as "国人" from the language correspondence relationship table. Traversing is subsequently started from "人" to find a first object "人民" from the language correspondence relationship table. Accordingly, traversing is started from "民", and no first object corresponding to subsequent element combination is found. Traversing may then be started from "解" to find a first object as "解放军" from the language correspondence relationship table. Then, traversing is started from "放" and "军", and no first object corresponding to subsequent element combination is found. In addition, each element in the unlisted word "中国人民解放军" has a corresponding first object in the language correspondence relationship table.

Since an element set is generated each time when a first object is obtained through partitioning, the following element sets are obtained in this example:

(1) Element set={"中国","人民解放军"};
(2) Element set={"中国人","民解放军"};
(3) Element set={"中国人民","解放军"};
(4) Element set={"中","国人","民解放军"};
(5) Element set={"中国","人民","解放军"};
(6) Element set={"中国人民","解放军"};
(7) Element set={"中国人民","解放","军"};
(8) Element set={"中","国","人","民","解","放","军"}.

As can be seen, the element sets (2) and (4) have non-existing first objects in the language correspondence relationship table, and therefore need to be eliminated. Respective weight values of each subset of the above element sets are multiplied to obtain a respective weight value product result of each element set. An element set with the maximum product result is then determined as an optimal partitioning result. In this way, this partitioning method does not use any weight value during partitioning.

In short, in the three aforementioned partitioning methods, the first partitioning method and the second partitioning method use weight values during partitioning. The weight values are used to further simplify the process of partitioning and reduce the complexity of algorithm. The third partitioning method is a partitioning method that currently exists, a process of partitioning process being equivalent to increasing the redundancy. Apparently, during real applications, one skilled in the art is not restricted to these partitioning methods. Any existing partitioning methods are also applicable.

Figure 4:
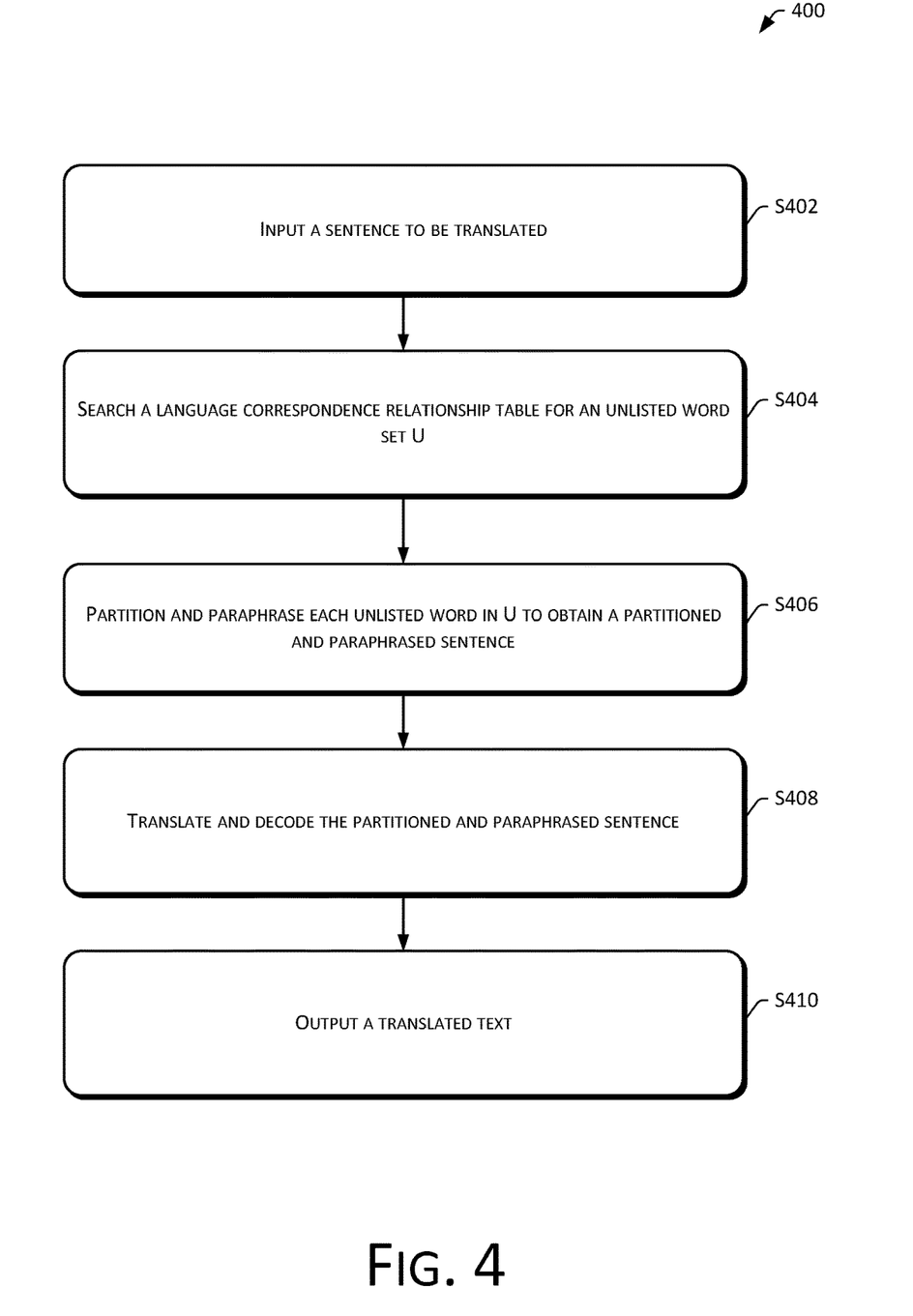
FIG. 4 is a flowchart illustrating a complete process of performing a translation according to the embodiments of the present disclosure.

To describe an application process of the foregoing partitioning methods in a real machine translation comprehensively, the embodiments of the present disclosure further provide the following example 400 as shown in FIG. 4 for illustration.

At S402, a sentence to be translated, for example, "我爱中国人民解放军", is inputted.

At S404, each term in "我爱中国 人民解放军" is searched for based on an off-line trained translation model and a language correspondence relationship table, and "中国人民 解放军" that cannot be found is determined as an unlisted word and stored in an unlisted word set U.

At S406, for each unlisted word in U, the above partitioning method is used to perform partitioning and paraphrasing, and "我爱中国 人民解放军" is partitioned and paraphrased into "我/爱/中国/ 人民/解放军".

At S408: a machine translation decoding process is invoked to perform translation for the optimized "我/爱/中国/ 人民/解放军" after partitioning and paraphrasing. The translation process may be either a conventional translation process, or a decoding that maps paraphrased parts with special indicators into respective features and combines with these new features in the conventional decoding process.

At S410, a translated text T is obtained. This operation may obtain a direct output of the translated text T. Alternatively, this operation may combine with an output from a conventional translation process to perform a fusion of translation systems to construct a further optimized translated text which is outputted as a final result.

Figure 5:
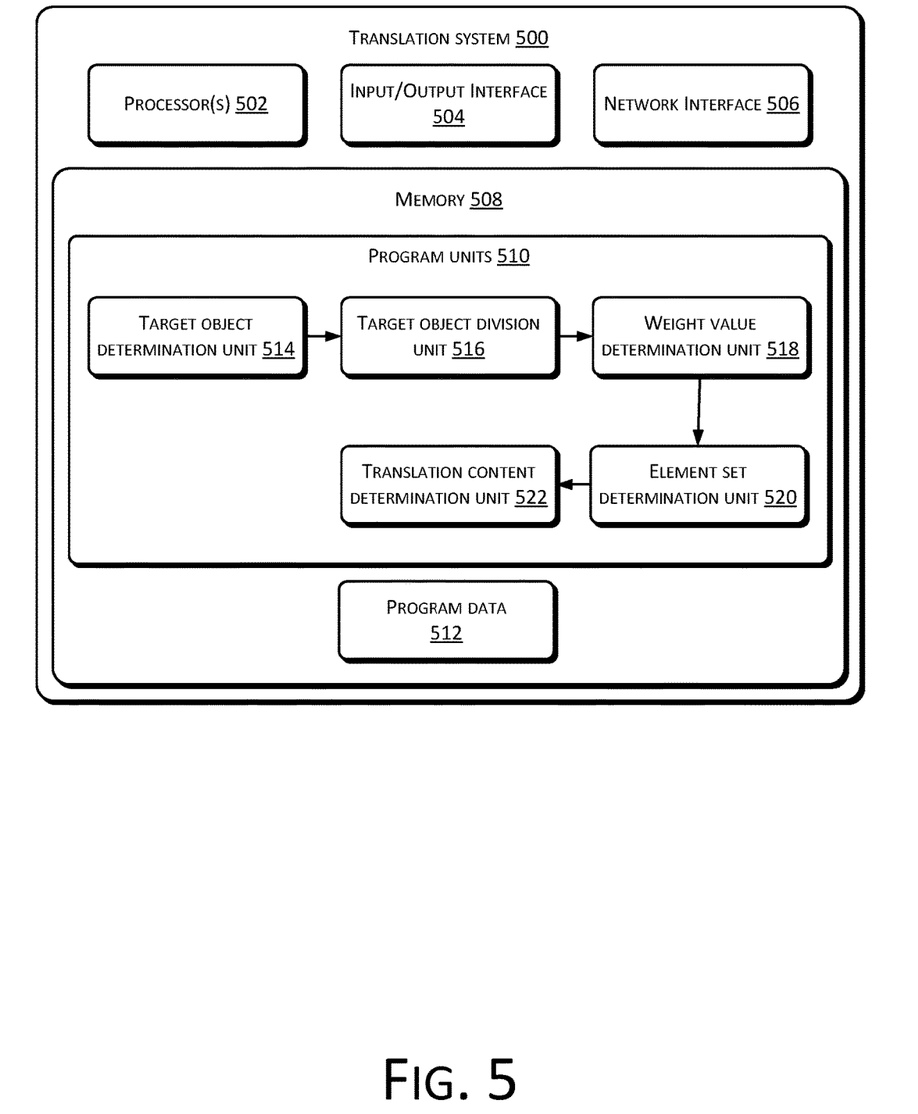
FIG. 5 is a schematic diagram illustrating a system of performing a translation according to the embodiments of the present disclosure.

Based on the same technical concept, the embodiments of the present disclosure further provide a translation system. FIG. 5 shows an example translation system 500 in accordance with the present disclosure. In implementation, the system 500 may include one or more computing devices. By way of example, the system 500 may include one or more processors 502, an input/output (I/O) interface 504, a network interface 506 and memory 508.

The memory 508 may include a form of computer-readable media, e.g., a non-permanent storage device, random-access memory (RAM) and/or a nonvolatile internal storage, such as read-only memory (ROM) or flash RAM. The memory 508 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 508 may include program units 510 and program data 512. The program units 510 may include a target object determination unit 514, a target object division unit 516, a weight value determination unit 518, an element set determination unit 520, and a translation content determination unit 522.

In implementations, the target object determination unit 514 may determine a target object to be translated, the target object including a plurality of elements.

In implementations, the target object division unit 516 may divide the target object to be translated based on a language correspondence relationship to obtain at least one element set, where the language correspondence relationship includes a plurality of first objects of a first language, at least one corresponding second object of a second language to which each first object is translated and a corresponding weight value of each second object, the first object and the second object include at least one element, the element set includes multiple first objects, and each element set includes all the plurality of elements of the target object, the first language is a language of the target object, the second language is a language of a machine translation.

In implementations, the weight value determination unit 518 may determine a weight value of a second object corresponding to each first object in each element set based on the language correspondence relationship.

In implementations, the element set determination unit 520 may determine a comparison value of each element set based on the determined weight value, and select an element set with the maximum comparison value.

In implementations, the translation content determination unit 522 may determine a second object having a maximum weight value corresponding to each first object in the selected element set based on the correspondence relationship, and combine all the determined second objects as translation content of the target object.

It should be noted that the foregoing units may be located in a machine translation device, or distributed among different machine translation devices. When the units are distributed among different machine translation devices, the capability of concurrent processing can be improved, thereby greatly improving the processing efficiency.

In implementations, the target object determination unit 514 may use a source object of the first language to be translated as the target object to be translated, or use an object obtained after a root or affix transformation of the source object of the first language to be translated as the target object to be translated. Affixes include prefixes, postfixes and/or infixes. For example, a German term "Verlagshaus" may be partitioned as "Verlag s haus", where s is an infix. In implementations, in case of a root or affix transformation, for example, multiple transformations, English term "china" may be transformed into "chinese". In addition, a target object may include a plurality of elements. An element may represent different meanings in different natural languages. For Chinese language, an element refers to each Chinese character, and for western languages such as English, an element refers to each letter. For example, after multiple transformations, a target object "chinese" may have elements such as "c, h, i, n, e, s, e". An unlisted word "中国人民解放军" may have elements such as "中, 国, 人, 民, 解, 放, 军".

After the target object is determined, the target object division unit 516 may perform a process of partitioning. In implementations, the following partitioning scenarios of the target object division unit 516 are provided in the present disclosure.

A First Scenario:

In implementations, the target object division unit 516 may be used for:

constructing a target object to be translated into an element group to be partitioned;

traversing each element of the element group to be partitioned in an order from left to right, and determining whether a partition point in the element group to be partitioned exists, where an object formed by elements before the partition point and an object formed by elements after the partition point in the element group to be partitioned exist in the language correspondence relationship;

if partition points exist, determining an optimal partition point of the element group to be partitioned from among the partition points, where a product of a weight value of a second object corresponding to an object before the optimal partition point and a weight value of a second object corresponding to an object after the optimal partition point in the element group to be partitioned is the maximum, as determined according to the language correspondence relationship;

treating the object formed by elements before the optimal partition point and the object after the optimal partition point as element groups to be partitioned, and returning to the operation of determining whether a partition point exists in the element group to be partitioned;

if no partition point exists, terminating the partitioning of the element group to be partitioned; and if partitioning of all the element groups to be partitioned is terminated, determining at least one element set according to each element group to be partitioned.

For example, given an unlisted word "abcdefg", only one element group to be partitioned [abcdefg] currently exists. Traversing is performed from the first letter a to find the first optimal partition point, while ensuring that terms before and after such partition point can be found in a language correspondence relationship table, and a product of weight values of such two portions (which are formed using the partition point to divide [abcdefg]), is the maximum as compared with results of other partition points. According to this rule, [abcdefg] is partitioned into two element groups to be partitioned, [abcd] and [efg]. The element group to be partitioned, [abcd] and [efg], are then further partitioned according to the above method until no partition point exists, and partitioning of element groups to be partitioned is terminated accordingly. An element set may then be determined based on element groups to be partitioned obtained in each partitioning and element groups to be partitioned that are generated previously.

For another example, given an unlisted word " 中国人民解放军 ", traversing is performed from the first character " 中 " to find a partition point, with a requirement of ensuring that terms before and after the partition point can be found in a language correspondence relationship table. The partition point divides " 中国人民解放军 " into two parts. Two scenarios may exist for this partition point, namely, " 中国/人民解放军 " and " 中 国人民/解放军 ", for example. In order to obtain a better partition point, weight values in the language correspondence table are used at this point, and a weight product of an element set obtained from the combination " 中国+人民解放军 " is found to be maximum after calculation. Accordingly, the first optimal partition point is determined to be located between " 国 " and " 人 ", and a partitioning result is " 中国+人民解放军 ".

These two parts " 中国 " and " 人民解放军 " are then further partitioned individually according to the above method. " 中国 " is found to be " 中 " and " 国 " after partition. The partition point between " 中 " and " 国 ", is unique and is therefore the optimal partition point therefor. In addition, " 人民解放军 " is partitioned into " 人民 " and " 解放军 ". The partition point between " 人民 " and " 解放军 ", is unique and is therefore the optimal partition point therefor.

Next, " 人民 " and " 解放军 " are further partitioned individually according to the above method to obtain " 人 " and " 民 ". The partition point is between 人 and 民, which is unique and therefore is the optimal partition point. In addition, " 解放军 " is partitioned into " 解放 " and " 军 ". The partition point is between 解放 and 军, which is unique and therefore is the optimal partition point.

Finally, " 解放 " is further partitioned according to the above method to obtain " 解 " and " 放 ". The partition point is between " 解 " and " 放 ", is unique and is therefore the optimal partition point.

In this way, a process of partitioning for " 中国人民解放军 " is completed as above. Each time when an optimal partition point is obtained, an element set is generated. In implementations, the element set determination unit 520 may treat an object formed by elements before each optimal partition point and an object formed by elements after each optimal partition point as first objects, and determine at least one element set according to each first object, where each first object is included in at least one element set, elements included in all the first objects in an element set are identical to elements included in the target object, and a position of each element in the element set is the same as a respective position in the target object, and respective first objects included in different element sets are not completely the same. Therefore, the following element sets are obtained:

(1) Element set={" 中国 "," 人民解放军 "};
(2) Element set={" 中国 "," 人民 "," 解放军 "};
(3) Element set={" 中 "," 国 "," 人民解放军 "};
(4) Element set={" 中 "," 国 "," 人民 "," 解放军 "};
(5) Element set={" 中 "," 国 "," 人 "," 民 "," 解放军 "};
(6) Element set={" 中 "," 国 "," 人 "," 民 "," 解放 "," 军 "};
(7) Element set={" 中 "," 国 "," 人 "," 民 "," 解 "," 放 "," 军 "}.

A part of content of the language correspondence relationship table corresponding to first objects in " 中国人民解放军 " is shown in Table 2.

By using weight values associated with the first objects in " 中国人民解放军 ", weight values of subsets in each of the above six element sets are multiplied to obtain a respective weight value product result for each element set. Finally, a product result of the first element set is the maximum. For example, a weight value product of first objects in the second element set is A2*A3*A8, and the product result obtained by A2*A3*A8 is the maximum value. Therefore, an optimal partitioning result is determined to be " 中国+人民 解放军 ", and the partitioning of the unlisted word " 中国人民解放军 " is completed at this point. Accordingly, the above partitioning process is actually a recursive process. Only one execution function needs to be repeatedly executed when processing a program, and such weight-based processing provides a partitioning result having a higher accuracy.

A Second Scenario

In implementations, the target object division unit 516 may further used for dividing a target object into a plurality of shortest first objects according to an order of each element in the target object, where each of the shortest first objects is included in a language correspondence relationship; and combining multiple shortest first objects to obtain elongated first objects according to an order of the shortest first objects, and each time after an elongated first object is obtained, combining the obtained elongated first object and existing first objects to form an element set, where elements included in all first objects of an element set are the same as elements included in the target object, and a position of each element in the element set is the same as that in the target object, and respective first objects included in different element sets are not completely the same.

For example, given an unlisted word abcd, the word is partitioned using the above method. First, each element {a, b, c, d} of the unlisted word is obtained. Then, elements are combined according to a certain order and a principle of increasing character length to obtain a number of elongated first objects. An example elongating method is shown in Table 3, which is in an order from bottom to top and from left to right. As can be seen, a first object obtained by elongating [1,1], [2,2], [3,3] and [4,4] on a diagonal line corresponds to each element {a, b, c, d} of the unlisted word obtained by intersection of rows and columns, which continues to extend or elongate upwards in a direction indicated by arrows according to an order of increasing character length. [1,2], [2,3] and [3,4] obtain first objects ab, bc and cd correspondingly. Likewise, [1,3] and [2,4] obtain abc and bcd accordingly, and finally [1,4] corresponds to the target object abcd. Since an element set is generated each time when an elongated first object is found, the following element sets exist:

(1) Element set={"a", "b", "c", "d"};
(2) Element set={"ab", "c", "d"};
(3) Element set={"a", "bc", "d"};
(4) Element set={"a", "b", "cd"};
(5) Element set={"abc", "d"};
(6) Element set={"a", "bcd"};
(7) Element set={"abcd"}.

Second, third and fourth element sets belong to one type. Respective weight product results are determined for the element sets of this type, and only the group having the largest product result is maintained or kept. Likewise, fifth and sixth element sets are of a same type. Respective weight product results are determined for the element sets of this type, and only the group with the largest product result is maintained. In this way, only an optimal element set corresponding to an elongated first object of each type is provided in a final output. A longitudinal comparison may be performed based on these optimal element sets to finally obtain and determine an element set having the maximum product result as a final partitioning result. This type of partitioning method actually applies an idea of dynamic planning, and takes weight values into consideration, which also increases the accuracy of partitioning, and improves the processing efficiency of partitioning as compared with the first partitioning method.

A Third Scenario

In implementations, traversing is performed from a first element of a target object, first object(s) corresponding to combination(s) of this element and one or more subsequent elements is/are successively searched from a language correspondence relationship table, and an element set is constructed each time when a first object is determined.

For example, traversing is started from a first character "中" in an unlisted word "中国人民解放军", and first objects, which include "中国", "中国人", "中国人民" and "中国人民解放军" are found successively from a language correspondence relationship table. Traversing is then started from "国" to find a first object as "国人" from the language correspondence relationship table. Traversing is subsequently started from "人" to find a first object "人民" from the language correspondence relationship table. Accordingly, traversing is started from "民", and no first object corresponding to subsequent element combination is found. Traversing may then be started from "解" to find a first object as "解 放军" from the language correspondence relationship table. Then, traversing is started from "放" and "军", and no first object corresponding to subsequent element combination is found. In addition, each element in the unlisted word "中国人民解放军" has a corresponding first object in the language correspondence relationship table.

Since an element set is generated each time when a first object is obtained through partitioning, the following element sets are obtained in this example:
(1) Element set={"中国", "人民解放军"};
(2) Element set={"中国人", "民解放军"};
(3) Element set={"中国人民", "解放军"};
(4) Element set={"中", "国人", "民解放军"};
(5) Element set={"中国", "人民", "解放军"};
(6) Element set={"中国人民", "解放军"};
(7) Element set={"中国人民", "解放", "军"};
(8) Element set={"中", "国", "人", "民", "解", "放", "军"}.

As can be seen, the element sets (2) and (4) have non-existing first objects in the language correspondence relationship table, and therefore need to be eliminated. Respective weight values of each subset of the above element sets are multiplied to obtain a respective weight value product result of each element set. An element set with the maximum product result is then determined as an optimal partitioning result. In this way, this partitioning method does not use any weight value during partitioning.

The embodiments of the present disclosure are applicable to various universal or dedicated computing device environments or configurations, such as a personal computer, a server computer, a handheld device or a portable device, a tablet, a multi-processor device, and a distributed computing environment including any of the foregoing devices or apparatuses.

The embodiments of the present disclosure may be described in a general context of computer executable instructions executed by a computing device, for example, a program module. Generally, a program module may include a routine, a program, an object, a component, a data structure, etc., used for executing a particular task or implementing a particular abstract data type. The present disclosure may also be implemented in a distributed computing environment. In a distributed computing environment, a task may be executed via remote processing device(s) that is/are connected through a communications network. In a distributed computing environment, a program module may be located in local and remote computer storage media which may include a storage device.

In short, in an aspect of the embodiments of the present disclosure, a target object to be translated is determined first, and the target object to be translated is divided based on a language correspondence relationship to obtain at least one element set. In other aspects, a weight value of a second object corresponding to each first object in each element set is determined based on the language correspondence relationship, a maximum weight value of the second object corresponding to each first object in each element set is selected, multiplied to obtain a comparison value corresponding to the element set, thereby obtaining an element set having a maximum product result after comparison, with all second objects included in the element set having the maximum product result forming a translation content of the target object. In this way, when an unlisted word of a target object to be translated that cannot be found in existing translation models exists, the embodiments provided in the present disclosure partition the target object to be translated, and set a weight value of a second object corresponding each first object in each element set, determine an optimal translation content of the target object based on a computed comparison result of weight values, thus facilitating a more accurate translation result.

The present disclosure is described in accordance with flowcharts and/or block diagrams of the exemplary methods, apparatuses (systems) and computer program products. It should be understood that each process and/or block and combinations of the processes and/or blocks of the flowcharts and/or the block diagrams may be implemented in the form of computer program instructions. Such computer program instructions may be provided to a general purpose computer, a special purpose computer, an embedded processor or another processing apparatus having a programmable data processing device to generate a machine, so that an apparatus having the functions indicated in one or more blocks described in one or more processes of the flowcharts and/or one or more blocks of the block diagrams may be implemented by executing the instructions by the computer or the other processing apparatus having programmable data processing device.

Such computer program instructions may also be stored in a computer readable memory device which may cause a computer or another programmable data processing apparatus to function in a specific manner, so that a manufacture including an instruction apparatus may be built based on the instructions stored in the computer readable memory device. That instruction device implements functions indicated by one or more processes of the flowcharts and/or one or more blocks of the block diagrams.

The computer program instructions may also be loaded into a computer or another programmable data processing apparatus, so that a series of operations may be executed by the computer or the other data processing apparatus to generate a computer implemented process. Therefore, the instructions executed by the computer or the other programmable apparatus may be used to implement one or more processes of the flowcharts and/or one or more blocks of the block diagrams.

Exemplary embodiments of the present disclosure are described in the foregoing description. One skilled in the art can make other variations and modifications to the embodiments once understanding basic creative concepts. Therefore, the appended claims are intended to include the exemplary embodiments and all variations and modifications falling within the scope of the present disclosure.

Apparently, one skilled in the art can made various changes and variations to the present disclosure without departing from the spirit and scope of the present disclosure. In this way, if these modifications and variations of the present disclosure fall within the scope of the claims and their technical equivalents of the present disclosure, the present disclosure is also intended to include these modifications and variations.

What is claimed is:

1. A method implemented by one or more computing devices, the method comprising:
    determining a target object to be translated, the target object including a plurality of elements;
    dividing the target object to be translated to obtain at least one element set based at least in part on a language correspondence relationship;
    determining a weight value of at least one second object corresponding to a respective first object in a respective element set from the at least one element set based at least in part on the language correspondence relationship;
    determining a comparison value of the respective element set based at least in part on the determined weight value of the at least one second object corresponding to the respective first object in the respective element set;
    selecting an element set having a maximum comparison value from the at least one element set;
    determining a second object having a maximum weight value corresponding to a first object in the selected element set based at least in part on the language correspondence relationship; and
    combining the determined second object of each first object in the selected element set to form a translation content for the target object.

2. The method of claim 1, wherein the determining the target object to be translated comprises:
    using a source object of a target language to be translated as the target object to be translated; or
    using an object obtained after a root or affix transformation of the source object of the target language to be translated as the target object to be translated.

3. The method of claim 1, wherein the determining the comparison value of the respective element set comprises:
    determining a respective second object having a maximum weight value from the at least one second object; and
    multiplying the determined weight value of the respective second object corresponding to each first object in the respective element set to obtain the comparison value of the respective element set.

4. The method of claim 1, wherein:
    the language correspondence relationship comprises a plurality of first objects of a first language, the at least one second object corresponding to a second language to which the respective first object is translated, and a corresponding weight value of each second object of the at least one second object, the respective first object and the respective second object each including at least one element; and
    the respective element set includes one or more first objects of the plurality of first objects, the one or more first objects forming the target object, the first language being a language of the target object, and the second language being a language different from the first language.

5. One or more computer-readable media storing executable instructions that, when executed by one or more processors, cause the one or more processors to perform acts comprising:
    determining a target object to be translated, the target object including a plurality of elements;
    dividing the target object to be translated to obtain at least one element set based at least in part on a language correspondence relationship;
    determining a weight value of at least one second object corresponding to a respective first object in a respective element set from the at least one element set based at least in part on the language correspondence relationship;
    determining a comparison value of the respective element set based at least in part on the determined weight value of the at least one second object corresponding to the respective first object in the respective element set;
    selecting an element set having a maximum comparison value from the at least one element set;
    determining a second object having a maximum weight value corresponding to a first object in the selected element set based at least in part on the language correspondence relationship; and
    combining the determined second object of each first object in the selected element set to form a translation content for the target object.

6. The one or more computer-readable media of claim 5, wherein the determining the target object to be translated comprises:
    using a source object of a target language to be translated as the target object to be translated; or
    using an object obtained after a root or affix transformation of the source object of the target language to be translated as the target object to be translated.

7. The one or more computer-readable media of claim 5, wherein the determining the comparison value of the respective element set comprises:
    determining a respective second object having a maximum weight value from the at least one second object; and
    multiplying the determined weight value of the respective second object corresponding to each first object in the respective element set to obtain the comparison value of the respective element set.

8. The one or more computer-readable media of claim 5, wherein:
the language correspondence relationship comprises a plurality of first objects of a first language, the at least one second object corresponding to a second language to which the respective first object is translated, and a corresponding weight value of each second object of the at least one second object, the respective first object and the respective second object each including at least one element; and
the respective element set includes one or more first objects of the plurality of first objects, the one or more first objects forming the target object, the first language being a language of the target object, and the second language being a language different from the first language.

9. A system comprising:
one or more processors; and
memory storing executable instructions that, when executed by the one or more processors, cause the one or more processors to perform acts comprising:
determining a target object to be translated, the target object including a plurality of elements;
dividing the target object to be translated to obtain at least one element set based at least in part on a language correspondence relationship;
determining a weight value of at least one second object corresponding to a respective first object in a respective element set from the at least one element set based at least in part on the language correspondence relationship;
determining a comparison value of the respective element set based at least in part on the determined weight value of the at least one second object corresponding to the respective first object in the respective element set;
selecting an element set having a maximum comparison value from the at least one element set;
determining a second object having a maximum weight value corresponding to a first object in the selected element set based at least in part on the language correspondence relationship; and
combining the determined second object of each first object in the selected element set to form a translation content of the target object.

10. The system of claim 9, wherein the determining the target object to be translated comprises:
using a source object of the first language as the target object to be translated; or
using an object obtained after a root or affix transformation of the source object of the first language as the target object to be translated.

11. The system of claim 9, wherein the determining the comparison value of the respective element set comprises:
determining a respective second object having a maximum weight value from the at least one second object; and
multiplying the determined weight value of the respective second object corresponding to each first object in the respective element set to obtain the comparison value of the respective element set.

12. The method of claim 4, wherein the second language is used for machine translation.

13. The method of claim 4, wherein two or more first objects in the plurality of first objects include a same element of the target object.

14. The method of claim 4, wherein:
the one or more first objects in the respective element set include the plurality of elements of the target object.

15. The one or more computer-readable media of claim 8, wherein the second language is used for machine translation.

16. The one or more computer-readable media of claim 8, wherein two or more first objects in the plurality of first objects include a same element of the target object.

17. The one or more computer-readable media of claim 8, wherein the one or more first objects in the respective element set include the plurality of elements of the target object.

18. The system of claim 9, wherein:
the language correspondence relationship comprises a plurality of first objects of a first language, the at least one second object corresponding to a second language to which the respective first object is translated, and a corresponding weight value of each second object of the at least one second object, the respective first object and the respective second object each including at least one element.

19. The system of claim 9, wherein:
the respective element set includes one or more first objects of the plurality of first objects, the one or more first objects forming the target object, the first language being a language of the target object, and the second language being a language different from the first language.

20. The system of claim 19, wherein the second language is used for machine translation.

* * * * *